US012752462B2

(12) United States Patent
Tsuboi

(10) Patent No.: US 12,752,462 B2
(45) Date of Patent: Oct. 6, 2026

(54) MOLD MANUFACTURING METHOD AND MOLD

(71) Applicant: SEIKO EPSON CORPORATION, Tokyo (JP)

(72) Inventor: Tatsuya Tsuboi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 741 days.

(21) Appl. No.: 18/302,062

(22) Filed: Apr. 18, 2023

(65) Prior Publication Data

US 2023/0339146 A1 Oct. 26, 2023

(30) Foreign Application Priority Data

Apr. 21, 2022 (JP) ................................ 2022-069829

(51) Int. Cl.
*B29C 33/38* (2006.01)
*B29C 45/26* (2006.01)

(52) U.S. Cl.
CPC .... *B29C 33/3892* (2013.01); *B29C 2033/385* (2013.01); *B29C 45/26* (2013.01)

(58) Field of Classification Search
CPC ................ B29C 33/3892; B29C 45/26; B29C 2033/385
USPC ........................................................ 264/219
See application file for complete search history.

(56) References Cited

U.S. PATENT DOCUMENTS

2022/0063143 A1 3/2022 Anegawa

FOREIGN PATENT DOCUMENTS

CN 114103098 3/2022
JP 2017-124593 A 7/2017
JP 2022-038683 A 3/2022

*Primary Examiner* — Christina A Johnson
*Assistant Examiner* — Xue H Liu
(74) *Attorney, Agent, or Firm* — WORKMAN NYDEGGER

(57) ABSTRACT

A mold manufacturing method used in an injection molding apparatus has a first step of shaping a laminated body that becomes a part of the mold by discharging molding material and stacking layers on a base plate having a first member with a first opening and a second member assembled into the first opening, a second step of removing the second member from the base plate on which at least a part of the laminated body has been shaped, and performing at least one of a cutting process and an insertion of a nesting member on the laminated body, which is at least partially shaped, and a third step, performed after the second step, of assembling the base plate with the laminated body is shaped, or a base plate with the laminated body is shaped and all the second members are removed, into the second opening in a mold base.

9 Claims, 11 Drawing Sheets

MOLD MANUFACTURING METHOD AND MOLD

The present application is based on, and claims priority from JP Application Serial Number 2022-069829, filed Apr. 21, 2022, the disclosure of which is hereby incorporated by reference herein in its entirety.

BACKGROUND

1. Technical Field

The present disclosure relates to a mold manufacturing method and a mold.

2. Related Art

Regarding a mold used in an injection molding apparatus, JP-A-2017-124593 discloses that a three dimensional molding apparatus is used to shape a laminated body having a tunnel gate, and the laminated body is attached to a mold such as a metal mold.

When mounting the laminated body shaped by the three dimensional molding apparatus to the mold, it is desirable to precisely process the mounting surface of the laminated body to the mold in order to improve the quality of the molded product. However, since the processing of the mounting surface is a troublesome process, there is a demand for a technology that can more simply produce a mold having a laminated body.

SUMMARY

According to a first aspect of this disclosure, a mold manufacturing method for a mold used in an injection molding apparatus is provided. The mold manufacturing method has a first step of shaping a laminated body that becomes a part of the mold by discharging molding material and stacking layers on a base plate having a first member with a first opening and a second member that is assembled into the first opening; a second step of removing the second member from the base plate on which at least a part of the laminated body has been shaped, and performing at least one of a cutting process or an insertion of a nesting member on the laminated body, which was at least partially shaped; and a third step, performed after the second step, of producing the mold by assembling the base plate on which the laminated body was shaped or the base plate on which the laminated body was shaped and the second member was removed, into a second opening that is provided in a mold base.

According to a second aspect of this disclosure, a mold which is used in an injection molding apparatus is provided. This mold includes a base plate having a first member, wherein a first opening is formed in the first member into which a second member is assembled; a laminated body which is shaped on the base plate; and a mold base having a second opening, wherein: the base plate on which the laminated body is formed is assembled into the second opening of the mold base.

DESCRIPTION OF EMBODIMENTS

A. First Embodiment

Figure 1:
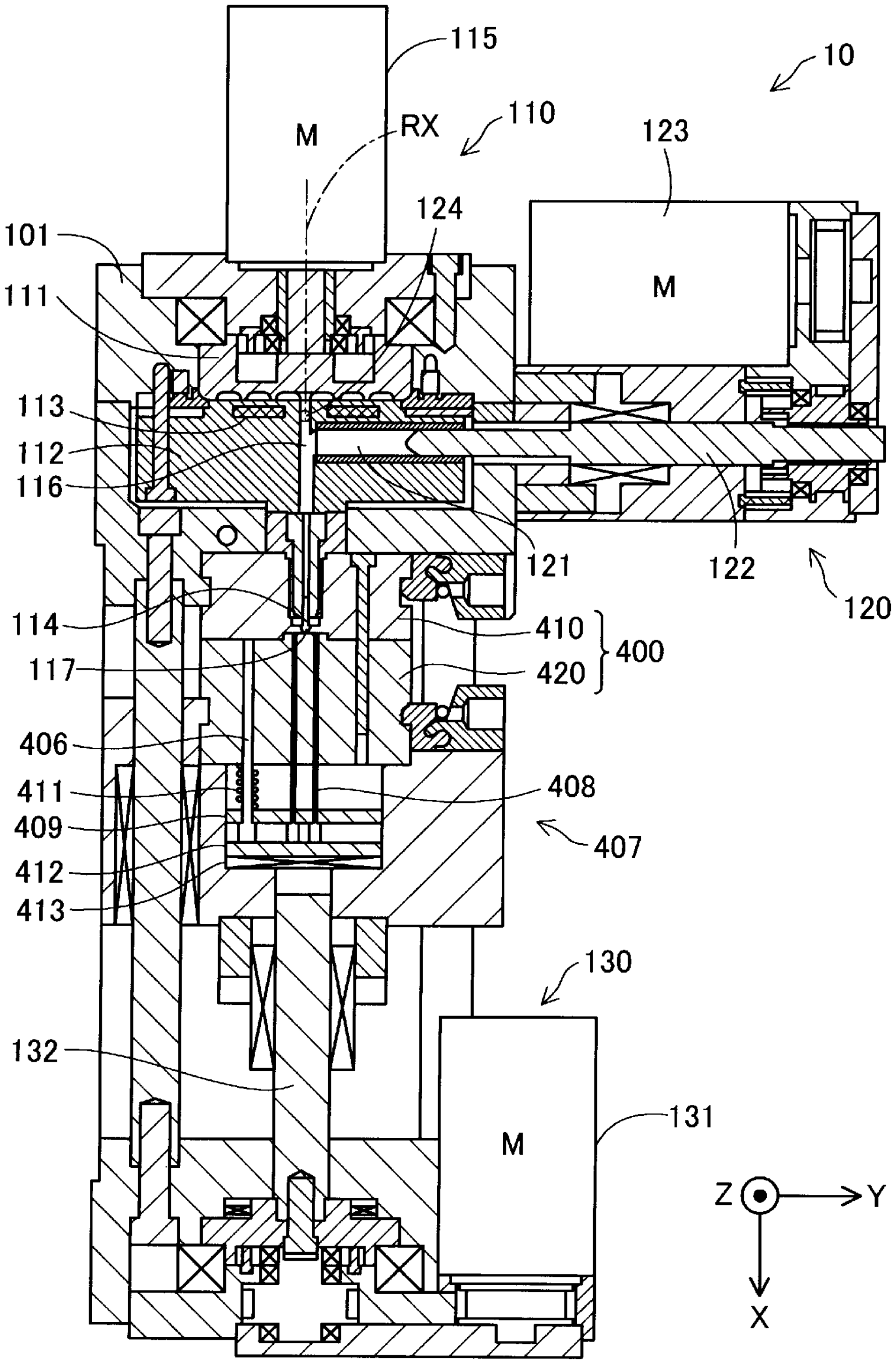
FIG. 1 is a cross-sectional view showing a schematic configuration of an injection molding apparatus.

FIG. 1 is a cross sectional view showing a schematic configuration of an injection molding apparatus 10 in which a mold 400 according to this embodiment is used. In FIG. 1, arrows indicating X, Y, and Z directions orthogonal to each other are shown. The X direction and the Y direction are parallel to a horizontal plane, and the Z direction is opposite to the gravity direction. The X, Y, and Z directions shown in FIG. 2 and subsequent figures correspond to the X, Y, and Z directions shown in FIG. 1. In the following explanation, positive and negative signs are used together in the directional notation to identify the direction, with "+" for positive direction, which is a direction indicated by an arrow, and "−" for negative direction, which is the opposite direction of the direction indicated by the arrow.

The injection molding apparatus 10 has a plasticizing apparatus 110, an injection control mechanism 120, a mold clamping device 130, and a mold 400.

The plasticizing apparatus 110 has a first flat screw 111, a first barrel 112, a first heater 113, and a first nozzle 114. The first flat screw 111 is housed in the housing portion 101. The first flat screw 111 is also called a scroll or a rotor. The first flat screw 111 is rotationally driven within the housing portion 101 around the rotation axis RX by the screw drive section 115, which is composed of a drive motor and reduction gear. In this embodiment, the X direction is a direction along the rotation axis RX. An outflow hole 116 is formed in the center of the first barrel 112. An injection cylinder 121, will be described later, is connected to the outflow hole 116. A check valve 124 is provided to the outflow hole 116 at upstream portion than the injection cylinder 121.

Figure 2:
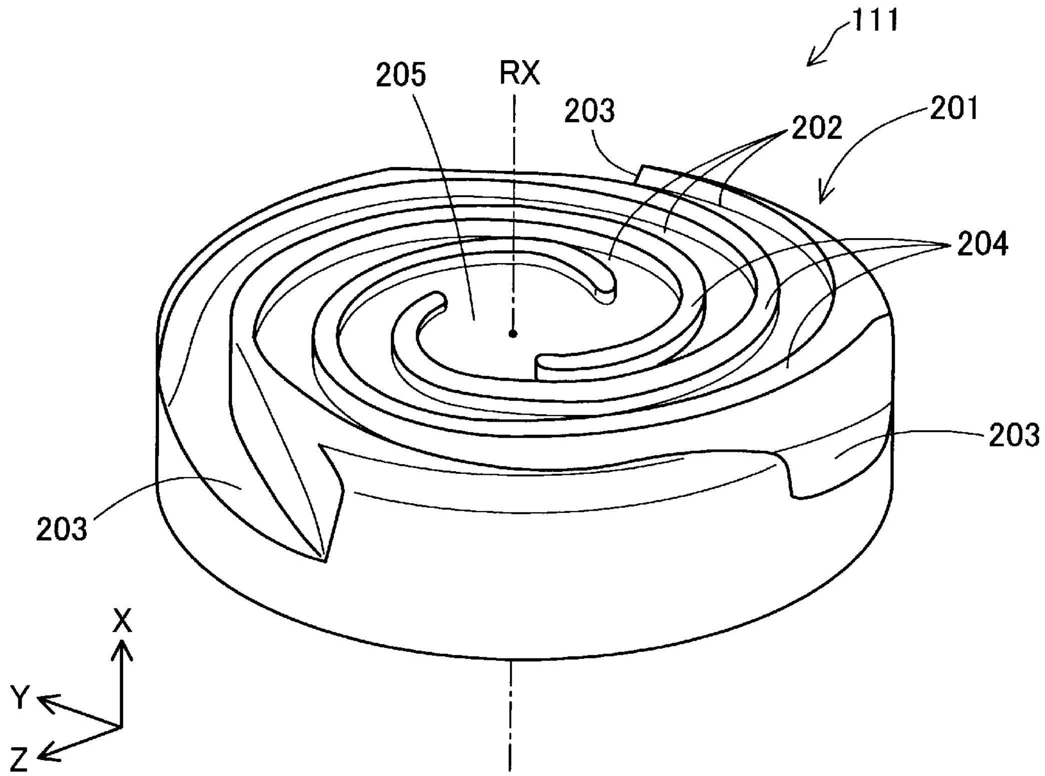
FIG. 2 is a perspective view showing a schematic configuration of a first flat screw.

FIG. 2 is a perspective view showing a schematic configuration of the first flat screw 111. The first flat screw 111 has a substantially cylindrical shape with a height in the direction along its central axis is smaller than its diameter. A groove forming surface 201 of the first flat screw 111, facing the first barrel 112, has whorl shaped grooves 202 centered at a central portion 205. The grooves 202 are connected to material feed ports 203 formed on the side surface of the first flat screw 111. A material supplied from a material supply section such as a hopper is supplied to the grooves 202 through the material feed ports 203. The grooves 202 are formed by being separated from each other by ridges 204. FIG. 2 shows an example in which three grooves 202 are formed, but the number of grooves 202 may be one, two, or more. The grooves 202 are not limited to a whorl shape, but may be a spiral or an involute curve shape, or may extend in an arc from the center portion to the periphery.

Figure 3:
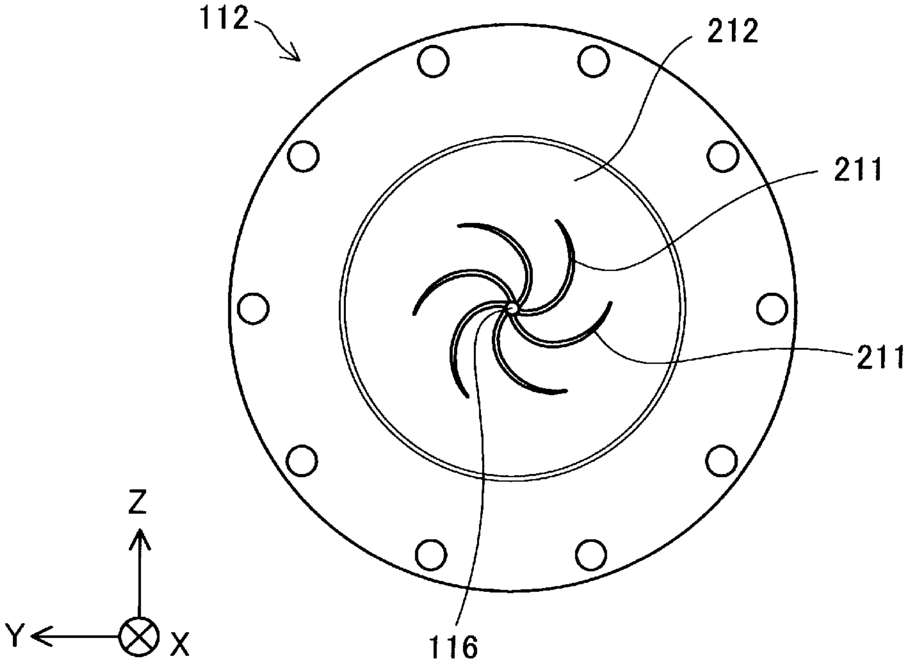
FIG. 3 is a schematic plan view of a first barrel.

FIG. 3 is a schematic plan view of the first barrel 112. The first barrel 112 has a facing surface 212 that faces the groove forming surface 201 of the first flat screw 111. The outflow hole 116 is formed in the center of the facing surface 212. The facing surface 212 has a plurality of guide grooves 211 connected to the outflow hole 116 and extending spirally from the outflow hole 116 to the periphery. The material supplied to the grooves 202 of the first flat screw 111 is plasticized between the first flat screw 111 and the first barrel 112 by the rotation of the first flat screw 111 and the heating of the first heater 113. At the same time, by the rotation of the first flat screw 111, the plasticized material flows along the grooves 202 and the guide grooves 211 to the central portion 205 of the first flat screw 111. The material flowing into the central portion 205 is directed through the outflow hole 116 in the center of the first barrel 112 to the injection control mechanism 120. The guide grooves 211 may not be provided in the first barrel 112. Further, the guide grooves 211 may not be connected to the outflow hole 116.

In this specification, "plasticization" is a concept that includes melting and is a change from a solid to a fluid state. Specifically, in the case of a material that undergoes a glass transition, plasticization means that the temperature of the material is set to be equal to or higher than its glass transition point. In the case of a material that does not undergo glass transition, plasticization means that the temperature of the material is set to be equal to or higher than its melting point.

As shown in FIG. 1, the injection control mechanism 120 has an injection cylinder 121, a plunger 122, and a plunger drive section 123. The injection control mechanism 120 has a function to inject the plasticized material in the injection cylinder 121 into a cavity 117 (to be described later). The injection control mechanism 120 controls an injection amount of the plasticized material injected from the first nozzle 114. The injection cylinder 121 is a substantially cylindrical member connected to the outflow hole 116 of the first barrel 112 and has a plunger 122 inside. The plunger 122 slides inside the injection cylinder 121 and pumps the plasticized material in the injection cylinder 121 to a first nozzle 114, which is provided in the plasticizing apparatus 110. The plunger 122 is driven by the plunger drive section 123, which is configured by a motor.

The mold 400 has a movable mold 420 and a fixed mold 410. The movable mold 420 and the fixed mold 410 are provided facing each other, and have a cavity 117 therebetween corresponding to the shape of the molded product. The movable mold 420 and the fixed mold 410 are formed with concave and convex shapes that demarcate the cavity 117. The concave shape that demarcates the cavity 117 is also referred to as a cavity portion, and the convex shape is also referred to as a core portion. Into the cavity 117, the plasticized material that flows out from the outflow hole 116 of the first barrel 112 is pumped by the injection control mechanism 120 and injected from the first nozzle 114. Although the details of the movable mold 420 and the fixed mold 410 will be described later, the movable mold 420 and the fixed mold 410 in this embodiment are resin molds with a laminated body in which the cavity 117 was shaped, a base plate, and a mold base.

The mold clamping device 130 has a mold driving section 131, and has a function to open and close the movable mold 420 and the fixed mold 410. The mold clamping device 130 rotates a ball screw 132 by driving the mold driving section 131, which is configured by a motor, to move the movable mold 420, which is coupled to the ball screw 132, with respect to the fixed mold 410, thereby opening and closing the mold 400. In other words, the fixed mold 410 is stationary in the injection molding apparatus 10, and the movable mold 420 is moved relative to the stationary fixed mold 410 to open and close the mold 400.

An extrusion mechanism 407 that releases a molded product from the mold 400 is provided on the movable mold 420. The extrusion mechanism 407 has an ejector pin 408, a support plate 409, a support rod 406, a spring 411, an extrusion plate 412, and a thrust bearing 413.

The ejector pin 408 is a rod-shaped member for pushing out a molded product that was molded in the cavity 117. The ejector pin 408 is provided to penetrate through the movable mold 420 to the cavity 117. The support plate 409 is a plate member that supports the ejector pin 408. The ejector pin 408 is fixed to the support plate 409. The support rod 406 is fixed to the support plate 409 and is inserted into a through hole formed in the movable mold 420. The spring 411 is disposed in a space between the movable mold 420 and the support plate 409 and inserted into the support rod 406. The spring 411 biases the support plate 409 such that the head portion of the ejector pin 408 can form a part of the wall surface of cavity 117 during molding. The extrusion plate 412 is fixed to the support plate 409. The thrust bearing 413 is attached to the extrusion plate 412 so that a head of the ball screw 132 may not damage the extrusion plate 412. Instead of the thrust bearing 413, a thrust slide bearing or the like may be used.

Figure 4:
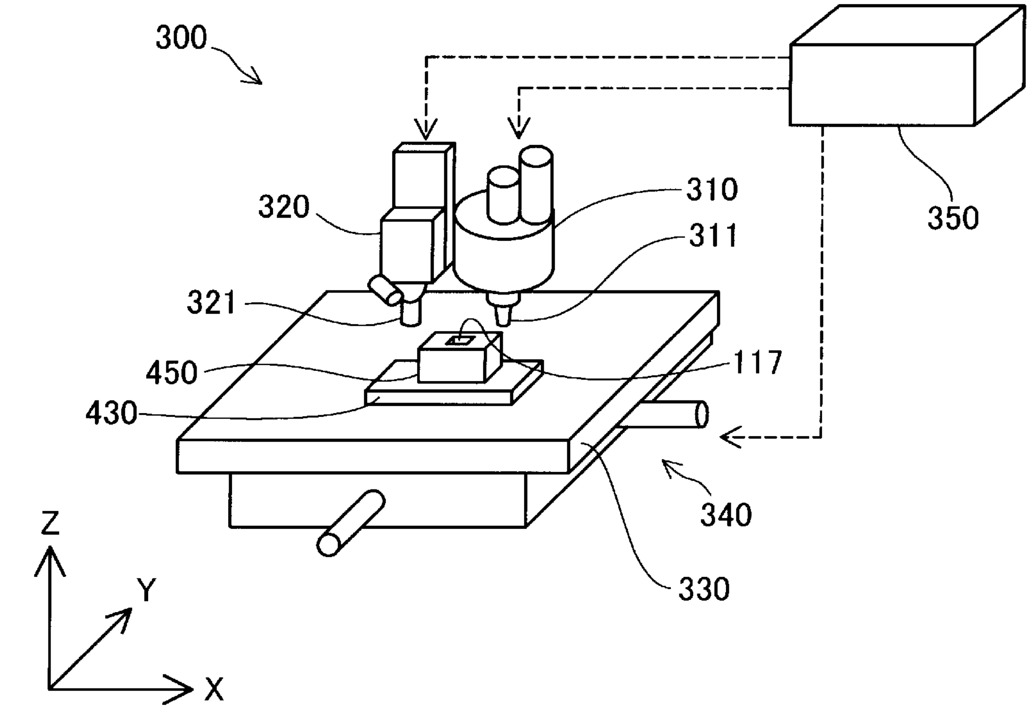
FIG. 4 is an explanatory diagram showing a schematic configuration of a three dimensional molding apparatus.

FIG. 4 is an explanatory diagram showing a schematic configuration of the three dimensional molding apparatus 300. The three dimensional molding apparatus 300 in this embodiment shapes a laminated body 450, which becomes a part of the mold 400 used in the injection molding apparatus 10, by stacking layers. The laminated body 450 is also referred to as a shaped component.

The three dimensional molding apparatus 300 according to this embodiment has a shaping unit 310, a cutting unit 320, a stage 330, a movement mechanism 340, and a control section 350.

The control section 350 is configured by a computer, that has one or more processors, a main storage device, and an input/output interface that inputs and outputs signals to and from the outside. The control section 350 controls the operations of the shaping unit 310, the cutting unit 320, and the movement mechanism 340 by having the processor execute programs and commands read into the main storage device. The control section 350 may be configured by a combination of a plurality of circuitries instead of the computer.

The three dimensional molding apparatus 300 changes the relative position between a second nozzle 311 and the stage 330 by driving the movement mechanism 340 while discharging a molding material from the second nozzle 311, which is provided in the shaping unit 310, toward the stage 330 under the control of the control section 350. By this, the laminated body 450 is shaped on the stage 330.

In addition, the three dimensional molding apparatus 300 changes the relative position between the cutting tool 321 and the stage 330 by driving the movement mechanism 340 while rotating a cutting tool 321 attached to the cutting unit 320 under the control of the control section 350. By this, the laminated body 450 stacked on the stage 330 is cut with the cutting tool 321 and the cavity 117 is formed.

Figure 5:
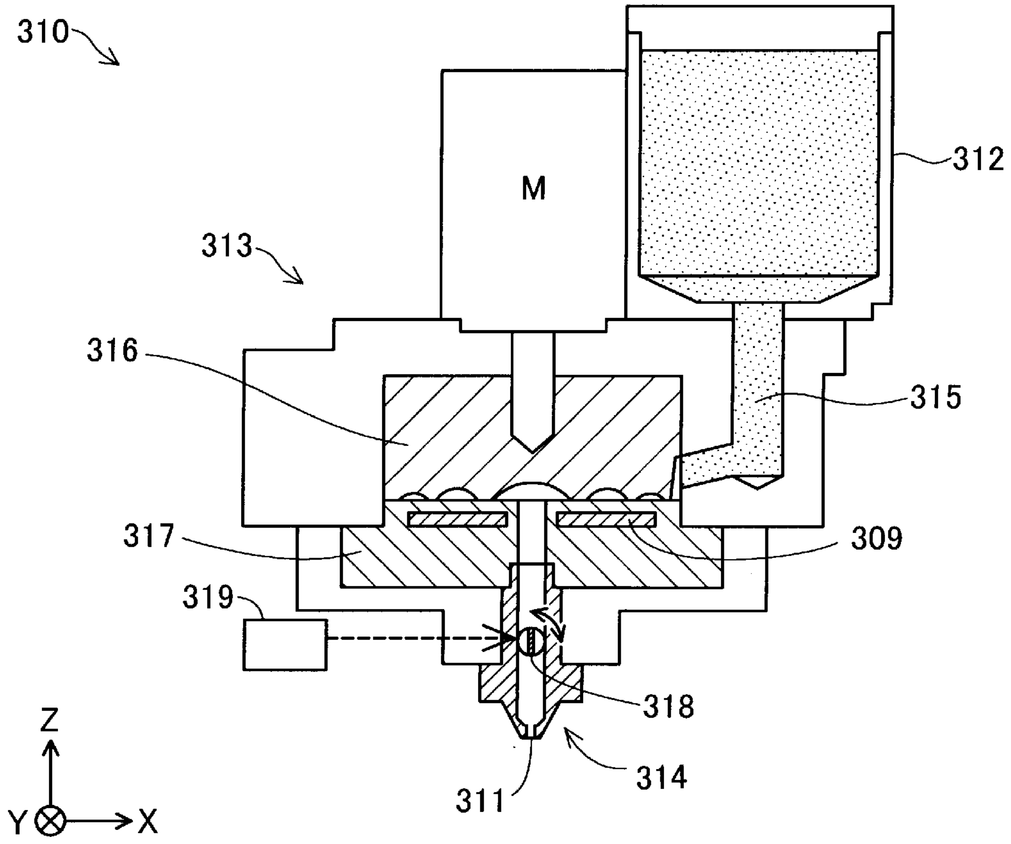
FIG. 5 is an explanatory diagram showing a schematic configuration of a shaping unit.

FIG. 5 is an explanatory view showing a schematic configuration of the shaping unit 310. The shaping unit 310 has a material supply section 312 that is a supply source of a material, a plasticizing section 313 that plasticizes the material into the molding material, and a discharge section 314 that discharges the molding material.

The material supply section 312 supplies raw materials to the plasticizing section 313 to produce molding material. The material supply section 312 is configured by, for example, a hopper that contains the raw material. The material supply section 312 is connected to the plasticizing section 313 via a material supply path 315 connected below the material supply section 312. The raw material is fed into the material supply section 312 in the form of pellets, powder, or the like. As the raw material, for example, a material containing a resin such as COC (cyclic olefin copolymer), ABS (acrylonitrile butadiene styrene), POM (polyacetal), PA (polyamide) 66, PPS (polyphenylene sulfide), PEEK (polyether ether ketone), or PBI (polybenzimidazole) is used as a main component. The main component is a component that is most abundant in the material in terms of mass, for example, 50 mass percent or more. In addition to the main component, the raw material may include component such as metal, ceramic, solvent, and binder.

The plasticizing section 313 is an apparatus having a configuration similar to that of the plasticizing apparatus 110 of the injection molding apparatus 10 shown in FIG. 1. That is, the plasticizing section 313 plasticizes the raw material by a second flat screw 316, a second barrel 317, and a second heater 309. The plasticizing section 313 plasticizes the raw material supplied from the material supply section 312 to produce a fluid, paste-like molding material, and leads the molding material to the discharge section 314.

The discharge section 314 has the second nozzle 311 that discharges the molding material produced by the plasticizing section 313 toward the stage 330. A discharge amount adjustment section 318 that can adjust the discharge amount of the molding material discharged from the second nozzle 311 is provided in the discharge section 314. In this embodiment, the discharge amount adjustment section 318 is configured by a butterfly valve. The control section 350 adjusts the discharge amount of the molding material by driving the valve drive section 319, which is configured by a motor or other device, to rotate the butterfly valve.

The cutting unit 320 shown in FIG. 4 is a device for cutting the laminated body 450 stacked on the stage 330 by rotating the cutting tool 321 attached to a tip of the stage 330 side of the cutting unit. For example, a flat end mill or a ball end mill can be used as the cutting tool 321. The control section 350 controls the cutting position by changing the relative position between the cutting tool 321 and the laminated body 450 stacked on the stage 330 by controlling the movement mechanism 340.

The stage 330 is supported by a movement mechanism 340. The movement mechanism 340 in this embodiment is configured as a three axes positioner that moves the stage 330 along the X, Y, and Z directions with respect to the shaping unit 310 and the cutting unit 320. In this embodiment, the base plate 430 constituting a part of the mold 400 is detachably fixed on the stage 330, and the laminated body 450 is shaped on the base plate 430. The movement mechanism 340 may move the shaping unit 310 and the cutting unit 320 with respect to the stage 330 without moving the stage 330. Also, the movement mechanism 340 may move both the stage 330, and the shaping unit 310 and the cutting unit 320. The movement mechanism 340 may have a function of inclining the stage 330 with respect to the horizontal plane, or may have a function of inclining the second nozzle 311 and the cutting tool 321.

Figure 6:
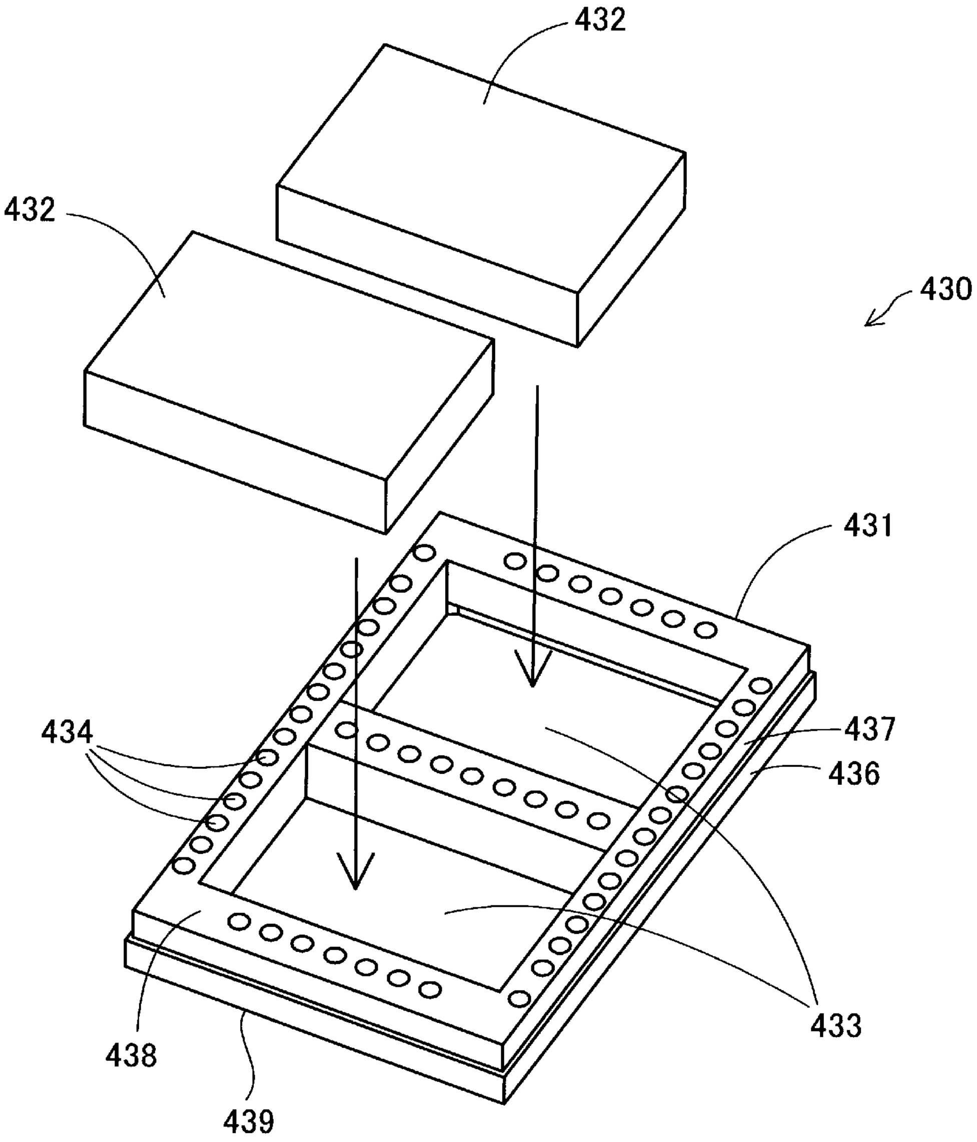
FIG. 6 is a perspective view showing a schematic configuration of a base plate on which a laminated body is shaped.

FIG. 6 is a perspective view showing a schematic configuration of the base plate 430 on which the laminated body 450 is shaped. The base plate 430 has a first member 431 and a second member 432. The first member 431 and the second member 432 are formed of metal in this embodiment. The first member 431 and the second member 432 are not limited to metal, and may be formed by materials such as glass or ceramic.

The first member 431 has first openings 433. In this embodiment, the first member 431 has a frame-like shape with two first openings 433 formed in a substantially rectangular shape. A plurality of through holes 434 are formed on the shaping surface 438 of the first member 431 on which the laminated body 450 is shaped.

Figure 7:
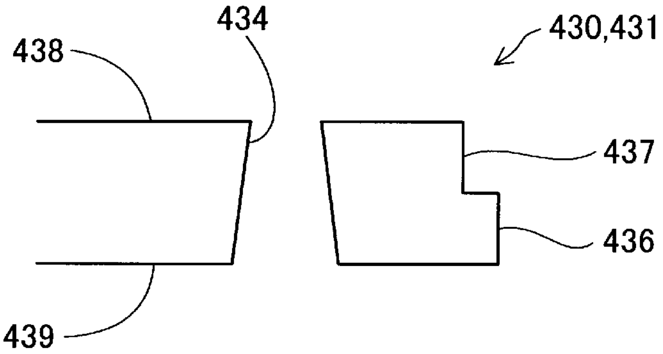
FIG. 7 is a view showing the shape of a through hole.

FIG. 7 is a view showing a shape of a through hole 434. FIG. 7 schematically shows a cross-sectional structure of the first member 431. The through hole 434 has a shape in which an opening area decreases toward the shaping surface 438. In other words, the through hole 434 has a reverse tapered shape with a diameter that increases from the shaping surface 438 to the bottom surface 439, which is the surface on the opposite side. In this embodiment, the plurality of through holes 434 are formed in the first member 431, but a plurality of recess portions with bottom portions may be formed in the shaping surface 438. It is desirable that the plurality of recess portions also have a shape in which an opening area decreases toward the shaping surface 438.

As shown in FIG. 6, the second members 432 have a substantially rectangular shape. In this embodiment, the surface of the second members 432 on which the laminated body 450 is formed does not have recesses or through holes. The second members 432 are assembled into the first openings 433 of the first member 431. In this embodiment, one each of the second members 432 is assembled into each of the two first openings 433. Therefore, in this embodiment, it can be said that the second member 432 has a plurality of members. The shape of the second member 432 is not limited to a substantially rectangular shape, but the shape of the second member 432 may have any shape as far as it can be assembled into the first opening 433 of the first member 431. For example, a plurality of second members may be combined and assembled into a single first opening 433. In other embodiments, the recesses or the through holes may be formed in the surface of the second member 432 on which the laminated body 450 is shaped. In this case, the recesses and the through holes in the first member 431 can be omitted.

As shown in FIGS. 6 and 7, a side surface of the base plate 430 has a first side surface 436 and a second side surface 437 that is closer to the shaping surface 438 than is the first side surface 436. The first side surface 436 is separated farther from the center of the base plate 430 than is the second side surface 437. That is, a step is formed on the outer periphery of the base plate 430 so that the size of the shaping surface 438 is smaller than the size of the bottom surface 439. In other embodiments, this step may not be formed.

Figure 8:
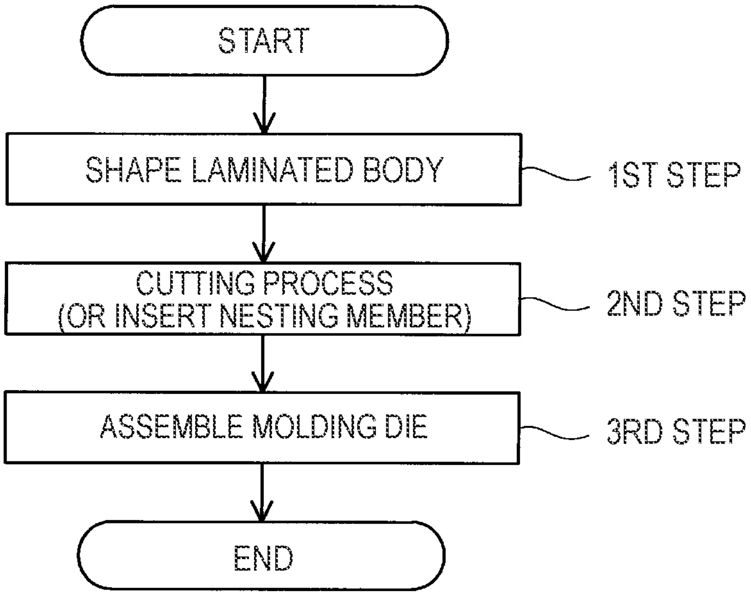
FIG. 8 is a process diagram showing a mold manufacturing method.

FIG. 8 is a process diagram showing a manufacturing method of the mold 400. Hereinafter, the manufacturing method of the movable mold 420 of the mold 400 will be described. In the first step, the three dimensional molding apparatus 300 first shapes the laminated body 450, which becomes a part of the mold 400, on the base plate 430 fixed on the stage 330.

Figure 9:
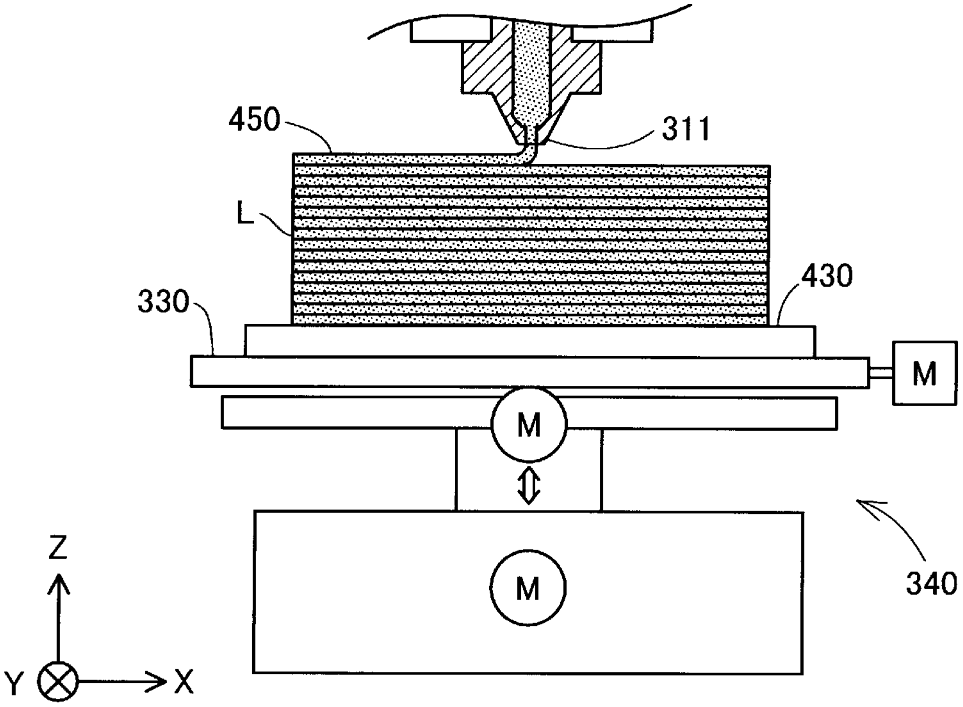
FIG. 9 is a diagram schematically showing a state in which the laminated body is shaped in the three dimensional molding apparatus.

FIG. 9 is a diagram schematically showing how the laminated body 450 is shaped in the three dimensional molding apparatus 300. In the three dimensional molding apparatus 300, the raw material in a solid state is plasticized and the molding material is generated in the plasticizing section 313 of the shaping unit 310. The control section 350 discharges molding material from the second nozzle 311 while keeping the distance between the stage 330 and the second nozzle 311 and changing the position of the second nozzle 311 with respect to the stage 330 in a direction along the top surface of the stage 330. The molding material discharged from the second nozzle 311 continuously accumulates on the base plate 430 in the movement direction of the second nozzle 311 to form a layer L.

The control section 350 repeatedly scans the second nozzle 311 to form a plurality of layers L. More specifically, after one layer L is formed, the control section 350 moves the position of the second nozzle 311 with respect to the stage 330 in the Z direction. The laminated body 450 is shaped by stacking additional layers L on top of the layers L formed as far.

The control section 350 may temporarily interrupt the discharge of the molding material from the second nozzle 311, for example, when moving the second nozzle 311 in the Z direction after depositing a single layer L, when shaping discontinuous passes, or the like. In such cases, the control section 350 controls the discharge amount adjustment section 318 to stop the discharge of the molding material from the second nozzle 311. After changing the position of the second nozzle 311, the control section 350 then resumes deposition of the molding material from the changed position of the second nozzle 311 by having the discharge amount adjustment section 318 resume discharge of the molding material.

Figure 10:
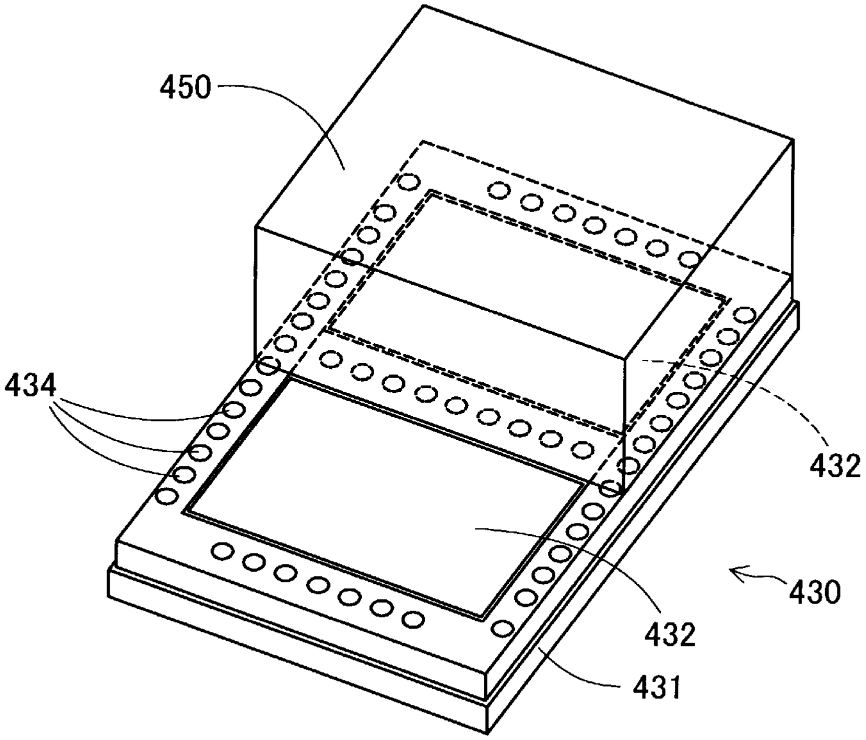
FIG. 10 is a perspective view showing a state in which the laminated body is formed on the base plate.

FIG. 10 is a perspective view showing a state in which the laminated body 450 is shaped on the base plate 430. The base plate 430 has a plurality of through holes 434 on the surface where the laminated body 450 is stacked. Therefore, as the second nozzle 311 moves to straddle the through holes 434 and discharges the molding material, a part of the molding material enters the through holes 434, and the through holes 434 provide an anchor effect. This suppresses the possibility of the laminated body 450 separating from the base plate 430 during shaping of the laminated body 450. In particular, in this embodiment, since the through hole 434 has a reverse tapered shape, which has a strong anchor effect, adhesion between the base plate 430 and the laminated body 450 can be enhanced.

Figure 11:
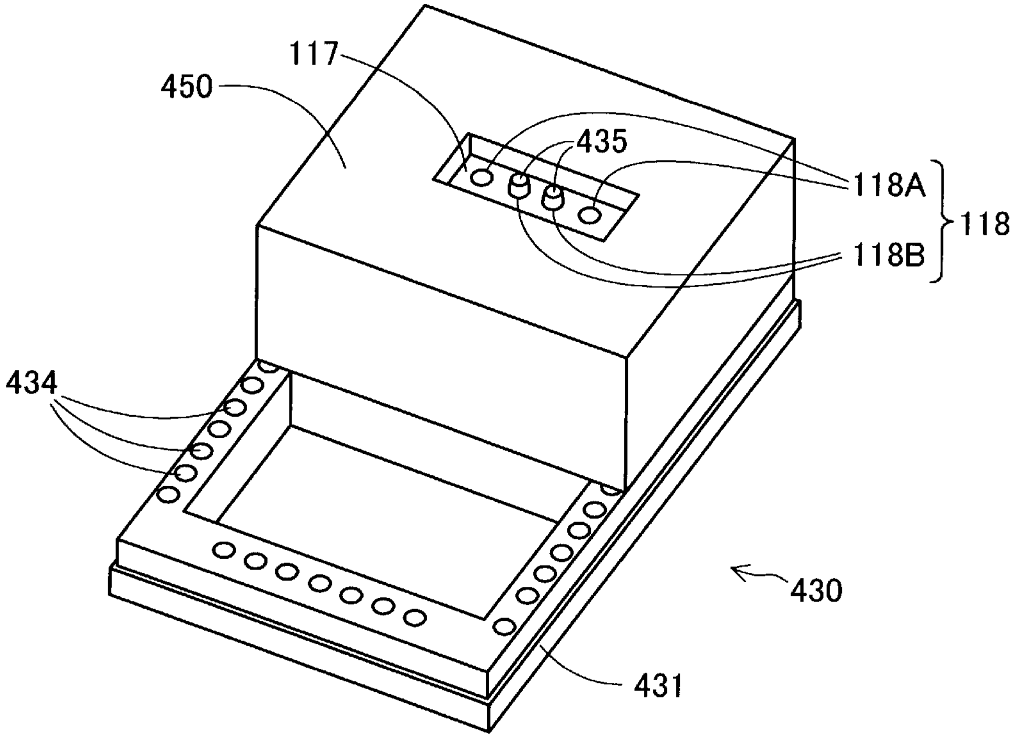
FIG. 11 is a perspective view showing a state in which a cutting process is performed on the laminated body.

In a second step shown in FIG. 8, the second member 432 is removed from the base plate 430, and the cutting unit 320 performs a cutting process on the laminated body 450. FIG. 11 is a perspective view showing a state in which the cutting process is performed on the laminated body 450. The three dimensional molding apparatus 300 forms the cavity 117 by cutting the laminated body 450 using the cutting unit 320. Although FIG. 11 shows an example of forming a concave shape that demarcates the cavity 117, a convex shape that demarcates the cavity 117 may be formed by cutting. FIG. 11 shows an example where only one cavity 117 is formed, but a plurality of cavities 117 may be formed.

In the second step of this embodiment, the three dimensional molding apparatus 300 further forms insertion holes 118 for inserting the ejector pin 408 and nesting members 435 by using the cutting unit 320 to drill holes in a bottom portion of the cavity 117. In the second step, the second member 432 is removed from the base plate 430 prior to the cutting process, so the formation of the insertion holes 118 by the cutting unit 320 is not blocked by the second member 432. FIG. 11 shows an example of two insertion holes 118A where the ejector pins 408 are inserted and two insertion holes 118B where the nesting members 435 are inserted are formed. In the second step, the insertion of the nesting members 435 into the laminated body 450 is performed by the pin-shaped nesting members 435 being inserted into the insertion holes 118B formed by the cutting process. The portion of the nesting members 435 protruding into the cavity 117 constitutes a part of the cavity 117. Either or both of the cavity 117 and the insertion holes 118 may be shaped by the three dimensional molding when the laminated body is shaped in the first step, rather than by the cutting process. If both the cavity 117 and the insertion holes 118 are shaped by the three dimensional molding, the second step may only perform the insertion of the nesting members 435. Further, in the second step, only the cutting process may be performed without performing the insertion of the nesting members 435.

In the second step, the front surface and the side surface of the laminated body 450 may be cut as well as the cavity 117 and the insertion holes 118. In this embodiment, since the step is formed on the outer periphery of the base plate 430 by the first side surface 436 and the second side surface 437, it is possible to suppress the cutting tool 321 from contacting the base plate 430 when cutting the side surface of the laminated body 450.

Note that the second step is not limited to being after the first step is completed, but may be performed, for example, at a timing when part of the laminated body 450 is shaped in the first step. For example, the second step may be performed, and the cutting process performed, every time a layer of a certain thickness is shaped.

Further, in the second step, prior to the cutting process and the insertion of the nesting members 435, all of the second members 432 may be removed from the base plate 430, or only the second member 432 that affects the cutting process and the insertion of the nesting members 435 may be removed. In other words, if the second member 432 has a plurality of members, at least one of them may be removed.

After the second step is performed, in the third step in FIG. 8, the base plate 430 on which the laminated body 450 is shaped is assembled into the mold base to manufacture the mold 400.

Figure 12:
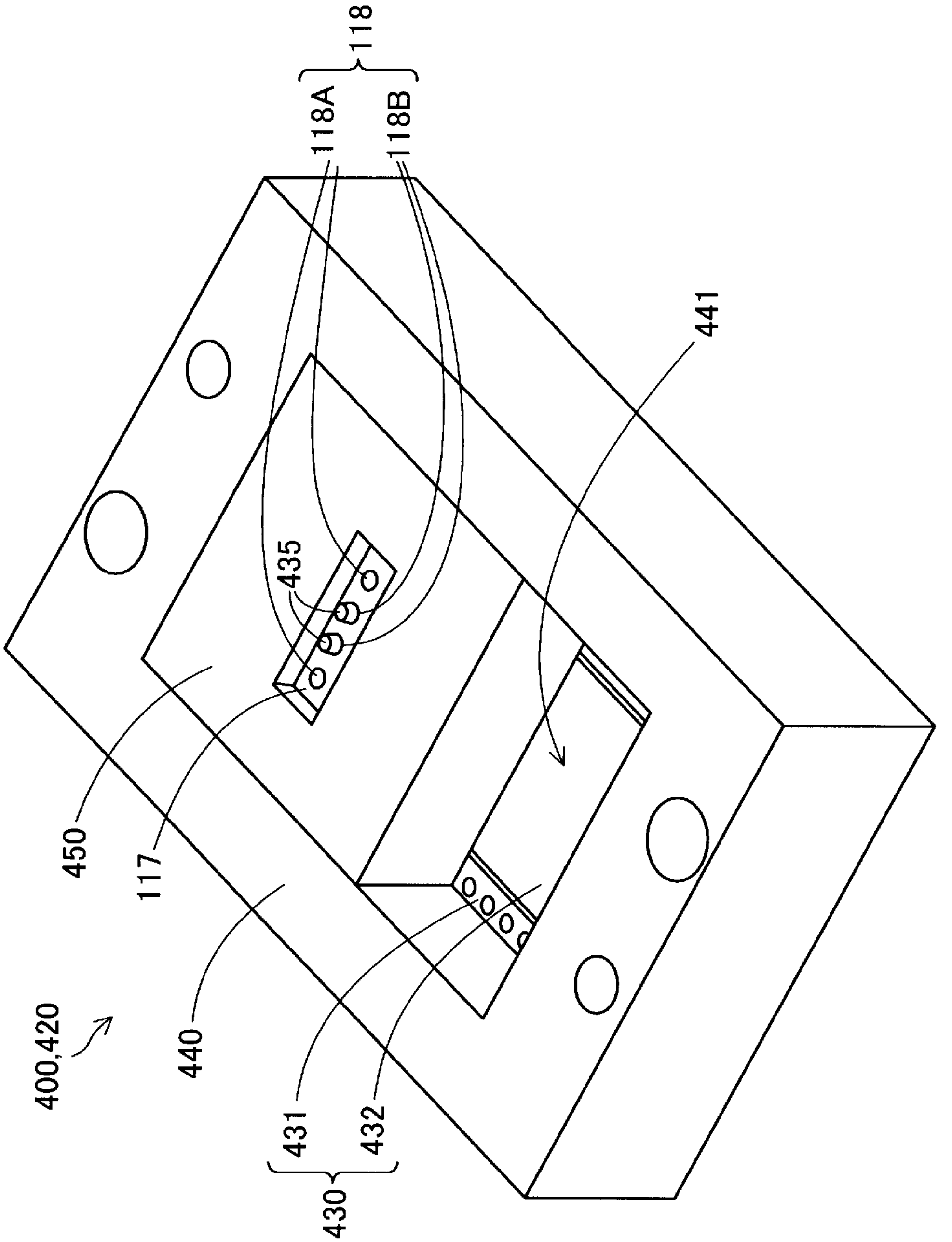
FIG. 12 is a view showing the mold assembled in a third step.
Figure 13:
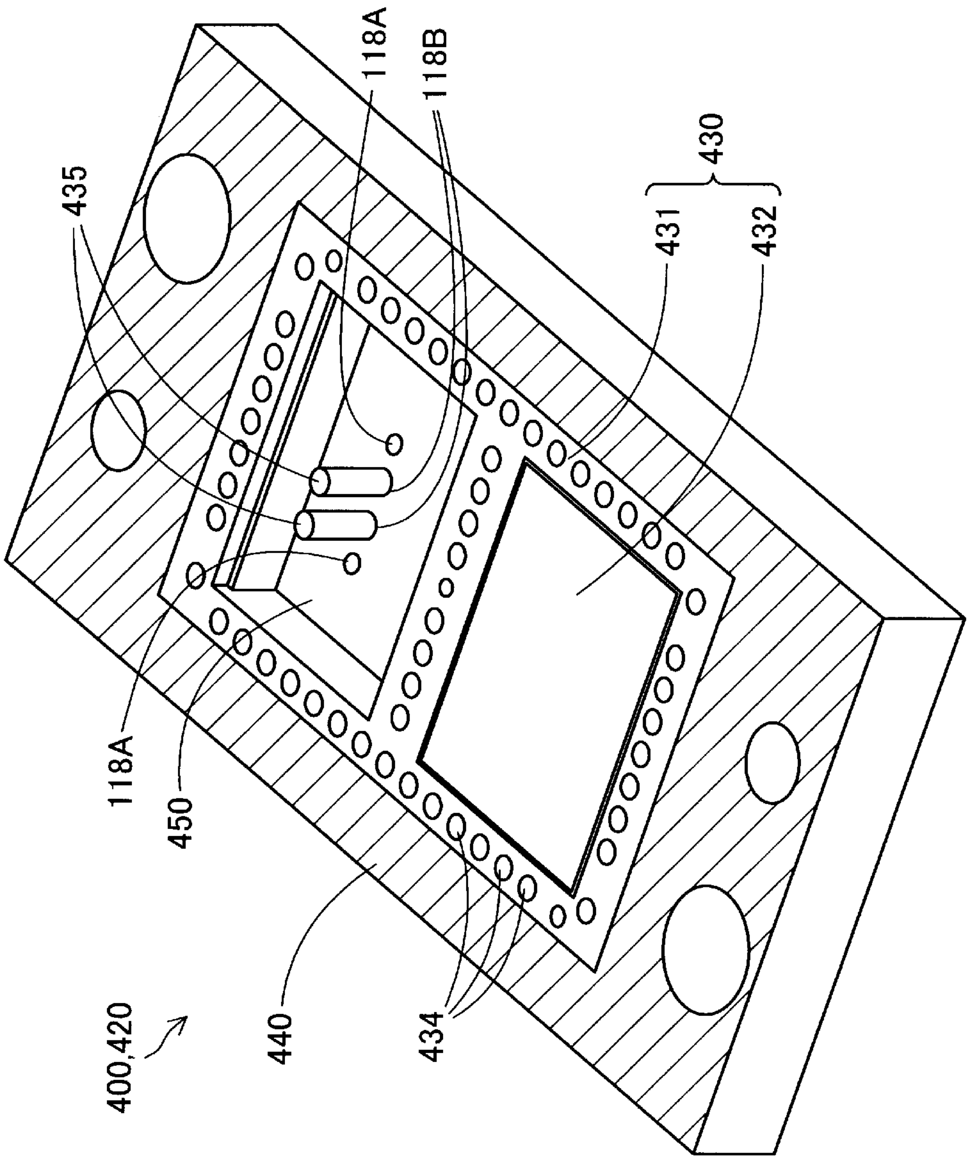
FIG. 13 is another view showing the mold assembled in the third step.

FIGS. 12 and 13 are views showing the mold 400 assembled in the third step. FIG. 12 shows a perspective view of the parting surface side of the movable mold 420, and FIG. 13 shows a perspective view of the opposite side thereof. The perspective view shown in FIG. 13 shows a cross section of the mold base 440 cut at a position corresponding to the bottom surface of the base plate 430.

In the third step described above, the mold base 440 made of metal is prepared, and the base plate 430 with the laminated body 450 shaped on it is assembled into the second opening 441 in the mold base 440. In this way, the mold 400 with the mold base 440, the base plate 430, and the laminated body 450 is assembled. The shape of the second opening 441 in the mold base 440 is a shaped to fit the base plate 430, or more specifically, to fit the first side surface 436 of the base plate 430.

As shown in FIGS. 12 and 13, in this embodiment, of the two first openings 433 of the base plate 430, the second member 432 is assembled into the first opening 433 on the side where the laminated body 450 is not shaped and the second member 432 is not assembled into the first opening 433 on the side where the laminated body 450 is shaped. In this way, by not assembling the second member 432 into the first opening 433 on the side where the laminated body 450 is shaped, the nesting members 435 and the ejector pins 408 can be freely placed in the first opening 433. In the third step, the base plate 430 on which the laminated body 450 has been shaped and all the second members 432 have been removed, may be assembled into the second opening 441 of the mold base 440. In other words, in the third step, the first member on which the laminated body 450 is shaped and all the second members 432 are removed from the base plate 430 may be assembled into the second opening 441 of the mold base 440.

Figure 14:
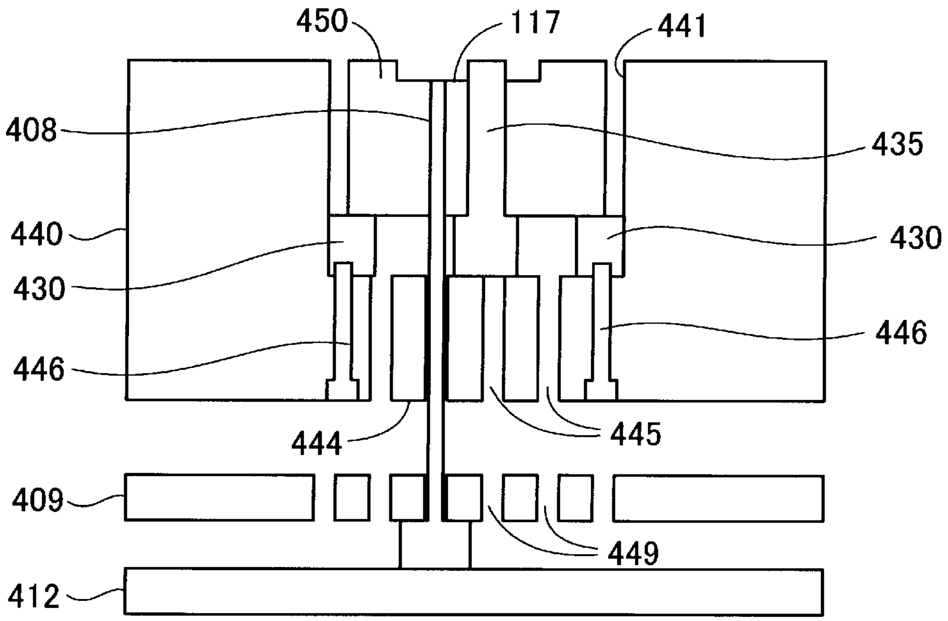
FIG. 14 is a view schematically showing a cross-sectional structure of a movable mold.
Figure 15:
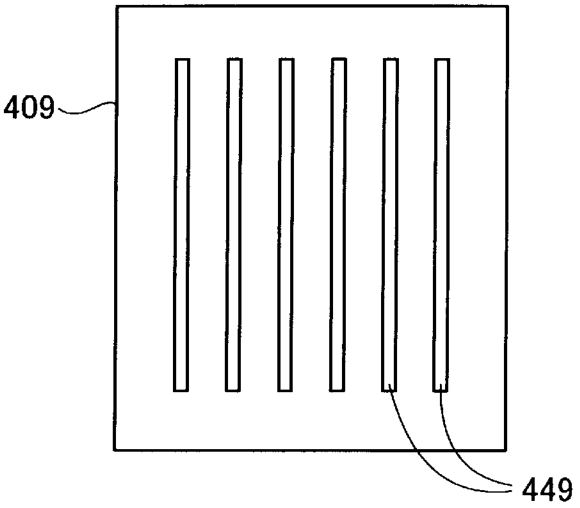
FIG. 15 is a plan view of a support plate.

FIG. 14 is a view schematically showing a cross-sectional structure of the movable mold 420. FIG. 15 is a plan view of the support plate 409. As shown in FIG. 14, the mold base 440 has a bottom portion 444 at the bottom of the second opening 441. In the third step described above, the first member 431 and the mold base 440 are fixed together by inserting insertion members 446 into the holes formed in the bottom surface 439 of the first member 431 and the holes formed in the bottom portion 444 of the mold base 440. The insertion members 446 are, for example, bolts or screws. In other embodiments, for example, the first member 431 may be fixed to the mold base 440 by arranging a member that presses the first member 431 from the second opening 441 side of the mold base 440.

A plurality of slit holes 445 are formed in a bottom portion 444 of a mold base 440. Further, as shown in FIG. 15, the support plate 409 supporting the ejector pins 408 also has a plurality of slit holes 449 at positions corresponding to the slit holes 445. The plurality of slit holes 445 and 449 are arranged in the longitudinal direction and parallel to each other. The ejector pins 408 are inserted into these slit holes 445 and 449. The ejector pins 408 can be positioned at any position in the longitudinal direction of the slit holes 445 and 449. Therefore, the degree of freedom of placement of the insertion holes 118A in the cavity 117 can be increased. In this embodiment, the slit holes are formed in the bottom portion 444 of the mold base 440 and the support plate 409, but the shape of the holes is not limited to this. For example, a number of rectangular or round holes may be formed in the bottom portion 444 and the support plate 409.

The mold 400 manufactured in the above way is attached to the injection molding apparatus 10 shown in FIG. 1 and used for the injection molding. It is desirable that the raw material used in the injection molding is a resin material with lower heat resistance than the material of the laminated body 450. Low heat resistance means low glass transition point or low melting point. For example, if the material of the laminated body 450 is PBI, then PEEK, PPS, POM, or ABS can be used as the material used for the injection molding. If the material of the laminated body 450 is PEEK, then PPS, POM, or ABS can be used as the material used for the injection molding. Further, if the material of the laminated body 450 is PPS, then POM or ABS can be used as the material used for the injection molding.

According to the first embodiment described above, the mold 400 is manufactured by directly discharging molding material onto the base plate 430 to shape the laminated body 450, and assembling the laminated body 450, together with the base plate 430, into the first opening 433 formed in the mold base 440. When the laminated body 450 is separately manufactured and fixed to the base plate 430 or the mold base 440, a mounting surface of the laminated body 450 to the base plate 430 or the mold base 440 must be processed accurately. However, in this embodiment, as described above, since the laminated body 450 is directly shaped on the base plate 430, the process for the mounting surface is unnecessary. Therefore, the mold 400 including the laminated body 450 can be easily manufactured.

In this embodiment, in the second step, at least a part of the plurality of second members 432 are removed to perform the cutting process and the insertion of the nesting members 435, and in the third step, the base plate 430, on which the laminated body 450 is shaped and some of the second members 432 are removed, is assembled into the second opening 441 in the mold base 440. Therefore, it is possible to perform the cutting process, the insertion of the nesting member 435, or to place the ejector pin 408 on the portion from which the second member 432 is removed.

In this embodiment, the shaping surface 438 of the first member 431 on which the laminated body 450 is shaped has a plurality of through holes 434. Therefore, it is possible to suppress separation of the laminated body 450 from the base plate 430. In particular, in this embodiment, since the plurality of through holes 434 have a shape in which the opening area decreases toward the shaping surface 438 on which the laminated body 450 is shaped, the degree of adhesion of the laminated body 450 to the base plate 430 can be more effectively increased.

In addition, in this embodiment, the side surface of the base plate 430 has the first side surface 436 and the second side surface 437, which is closer to the shaping surface 438 on which the laminated body 450 is shaped, than is the first side surface 436, and the first side surface 436 is farther from the center of the base plate 430 than is the second side surface 437. Therefore, the cutting tool can be prevented from contacting the side surface of the base plate 430, and the side surface of the laminated body 450 can be easily cut.

Further, in this embodiment, the surface of the second member 432 on which the laminated body 450 is shaped does not have recesses or through holes 434. As a result, shaping accuracy of the laminated body 450 stacked on the second member 432 can be improved. Further, the second member 432 can be easily removed from the base plate 430.

Further, in this embodiment, the mold base 440 has the bottom portion 444 at the bottom of the second opening 441, and the bottom portion 444 has a plurality of slit holes 445. Therefore, the degree of freedom in arranging the ejector pins 408 passing through the slit holes 445 can be increased.

In addition, in this embodiment, the insertion members 446 are inserted into the holes that are formed on the opposite side of the shaping surface 438, which is where the laminated body 450 is shaped on the first member 431, and into the holes formed in the mold base 440, and the first member 431 and the mold base 440 are fixed. Therefore, the base plate 430 and the mold base 440 can be firmly joined, whereby molding quality can be improved. In addition, since the first member 431 and the mold base 440 can be fixed from the bottom portion 444 side of the mold base 440, compared to the case where the first member 431 and the mold base 440 are fixed from the opposite side of the mold base 440, that is, from the laminated body 450 side, the space for fixing does not need to be secured on the laminated body 450 side, thereby improving the degree of design freedom of the laminated body 450.

In addition, according to this embodiment, since the laminated body 450 can be removed from the base plate 430 after use of the laminated body 450, the base plate 430 can be reused.

In this embodiment, the laminated body 450 is shaped using a molding material containing resin as a main component. Therefore, due to a heat insulating effect of the resin, it is possible to suppress rapid cooling of the plasticizing material in the cavity 117 during injection molding. Therefore, occurrence of sink marks on the molded product can be suppressed.

B. Second Embodiment

Figure 16:
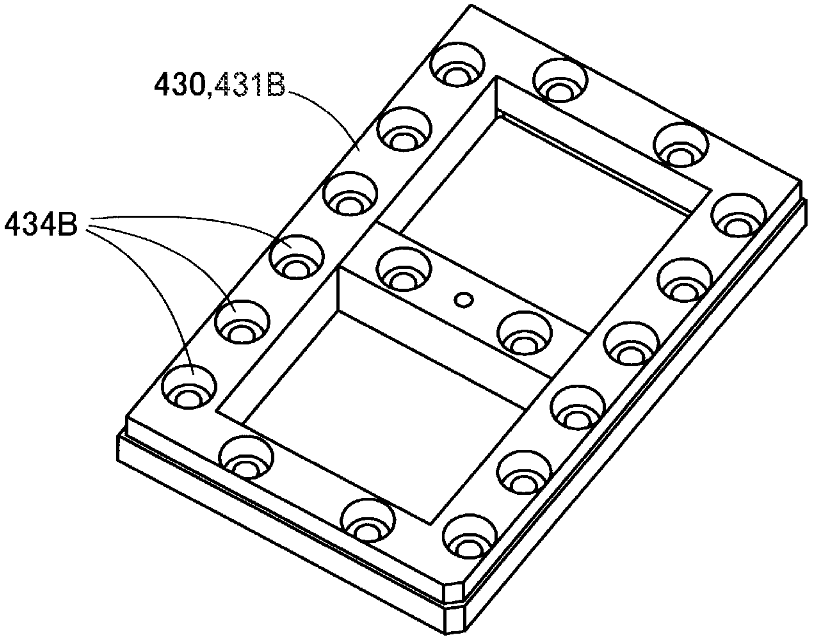
FIG. 16 is a perspective view showing a first member of the base plate in a second embodiment.
Figure 17:
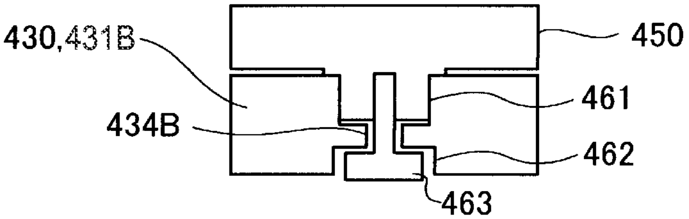
FIG. 17 is a view showing a cross-sectional structure of a through hole formed in the first member.

FIG. 16 is a perspective view showing a first member 431B of the base plate 430 in the second embodiment. FIG. 17 is a view showing a cross-sectional structure of a through hole 434B formed in the first member 431. The second embodiment differs from the first embodiment in the method of fixing the laminated body 450 to the first member 431.

In the first embodiment, as shown in FIG. 7, the first member 431 has a reverse tapered through hole 434. On the other hand, in the second embodiment, as shown in FIGS. 16 and 17, a cylindrical first hole 461 is formed on the shaping surface 438 side of the first member 431, a cylindrical second hole 462 is formed at a position corresponding to the first hole 461 on the bottom surface 439 side of the first member 431, and a through hole 434B with smaller diameter than those of the first hole 461 and the second hole 462 is formed at the portion sandwiched between the first hole 461 and the second hole 462.

In the second embodiment, the first member 431B has detachable fixing members 463 that are inserted into the plurality of through holes 434B to fix the laminated body 450 to the first member 431B. The fixing members 463 are screws in this embodiment.

In the second embodiment, the first step described in the first embodiment, that is, the step that shapes the laminated body 450 on the base plate 430, is performed in a state where the fixing members 463 are inserted into the through holes 434B from the second hole 462. As a result, when shaping the laminated body 450, the molding material is pressed against the first holes 461 of the fixing members 463, and the screw shapes are transferred to the laminated body 450.

According to the second embodiment described above, since the laminated body 450 is fixed to the first member 431 by the fixing members 463, movement of the laminated body 450 in both the floating direction and the sinking direction can be suppressed. Therefore, the degree of adhesion of the laminated body 450 to the base plate 430 can be increased. Further, in this embodiment, since the first hole 461 is not a reverse tapered shape but a cylindrical shape, if the fixing member 463 is removed from the laminated body 450, the laminated body 450 can be easily pulled off from the first member 431. In addition, in this embodiment, since the first holes 461 are provided around the fixing member 163, the molding material easily flows toward the fixing member 163.

In the second embodiment, the laminated body 450 is only required to be fixed to the first member 431 by the detachable fixing member 463, and either or both of the first holes 461 and the second holes 462 may be omitted.

C. Other Embodiments

Figure 18A:
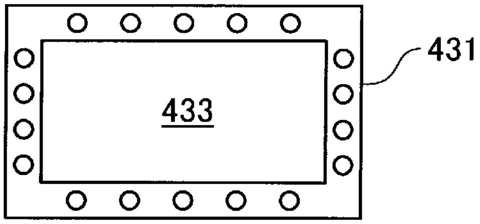
FIG. 18A is a view showing an example of another shape of the first member.
Figure 18B:
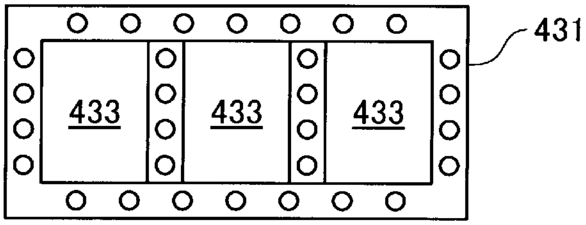
FIG. 18B is a view showing an example of still another shape of the first member.
Figure 18C:
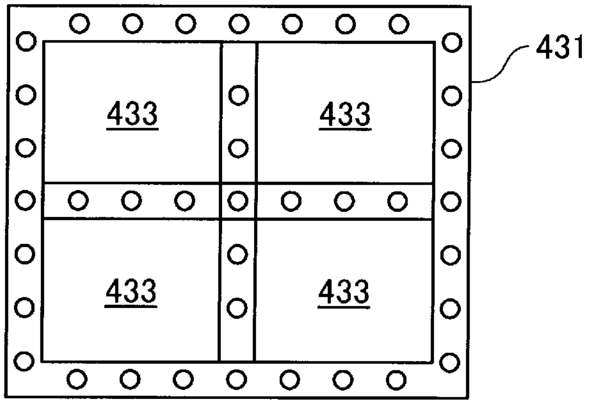
FIG. 18C is a view showing an example of further another shape of the first member.

C-1. The shape of the first member 431 configuring the base plate 430 is not limited to the shape shown in the first embodiment. FIGS. 18A, 18B, and 18C show examples of other shapes of the first member 431. An example of FIG. 18A shows a case that the first member 431 has a single first opening 433. An example of FIG. 18B shows a case that the first member 431 has three first openings 433 arranged in a same direction. An example of FIG. 18C shows a case that the first member 431 has four first openings 433 which are arranged two in the lateral direction and two in the longitudinal direction. As described above, the first member 431 can be formed in various shapes.

C-2. In the above embodiment, the injection molding apparatus 10 and the three dimensional molding apparatus 300 plasticize the material using the flat screw. Further, the injection molding apparatus 10 and the three dimensional molding apparatus 300 may plasticize the material using an inline screw instead of the flat screw.

C-3. In the above embodiment, an apparatus that adopts various three dimensional molding methods, such as a fused deposition modeling method, a powder sintering laminated modeling method, a stereolithography method, and an inkjet method, can be used as the three dimensional molding apparatus 300.

C-4. In the above embodiment, the shape of the base plate 430 is a shape that fits into the first opening 433 of the mold base 440. However, the shape of the base plate 430 may be smaller than that of the opening 441.

C-5. In the above embodiment, the manufacturing method of the movable mold 420 is explained, but the fixed mold 410 can be manufactured in the same manner. However, for the fixed mold 410, instead of the insertion holes 118 through which the ejector pins 408 pass, gate portions that lead the plasticized material that was injected from the first nozzle 114 into the cavity 117 are formed in the laminated body 450 by the shaping unit 310 or the cutting unit 320.

C-6. In the above embodiment, a new laminated body 450 with a cavity 117 of a different shape may be formed by cutting the laminated body 450 with the cavity 117 after using it as a mold 400. In this case, the stacking of layers in the first step can be omitted, and the mold 400 can be effectively reused.

D. Other Forms

The present disclosure is not limited to the above described embodiments, and can be realized in various configurations without departing from the spirit thereof. For example, the technical features of the embodiments corresponding to the technical features in each aspect described below can be appropriately replaced or combined in order to solve a part or all of the problems described above or in order to achieve a part or all of the effects described above. In addition, unless the technical features are described as essential in the present specification, the technical features can be appropriately deleted.

(1) According to a first aspect of the present disclosure, a manufacturing method of a mold used in an injection molding apparatus is provided. The mold manufacturing method has a first step of shaping a laminated body that becomes a part of the mold by discharging molding material and stacking layers on a base plate having a first member with a first opening and a second member that is assembled into the first opening; a second step of removing the second member from the base plate on which at least a part of the laminated body has been shaped, and performing at least one of a cutting process or an insertion of a nesting member on the laminated body, which was at least partially shaped; and a third step, performed after the second step, of producing the mold by assembling the base plate on which the laminated body was shaped or the base plate on which the laminated body was shaped and the second member was removed, into a second opening that is provided in a mold base. In this aspect of the mold manufacturing method, since the laminated body is directly shaped on the base plate which is assembled into the mold base, a process for the mounting surface of the laminated body to the base plate or the mold base is unnecessary. Therefore, a mold including the laminated body can be manufactured easily.

(2) In the above aspect, the second member has a plurality of members and in the second step, at least one member of the plurality of members is removed, and at least one of the cutting processes and the insertion may be performed. According to such an aspect, the nesting member and the ejector pin can be arranged in the portion from which the second member is removed.

(3) In the above aspect, a surface of the first member on which the laminated body is shaped may have a plurality of recesses or a plurality of through holes. According to such an aspect, it is suppressed that the laminated body separates from the base plate.

(4) In the above aspect, the plurality of recesses or the plurality of through holes may have a shape in which an opening area decreases toward the surface on which the laminated body is shaped. According to such an aspect, the degree of adhesion of the laminated body to the base plate can be increased.

(5) In the above aspect, the first member may have detachable fixing members that are inserted through the plurality of through holes to fix the laminated body to the first member. According to such an aspect, the degree of adhesion of the laminated body to the base plate can be increased.

(6) In the above aspect, the side surface of the base plate has a first side surface and a second side surface, which is closer to a surface on which the laminated body is formed than is the first side surface, and the first side surface may be farther away from a center of the base plate than is the second side surface. According to such an aspect, the side surface of the laminated body can be easily cut.

(7) In the above aspect, a surface of the second member on which the laminated body is shaped may not have a recess or a through hole. According to such an aspect, a shaping accuracy of the laminated body can be improved.

(8) In the above aspect, the mold base may have a bottom portion at a bottom of the second opening and the bottom portion may have a plurality of slit holes. According to such an aspect, the degree of freedom in arranging the ejector pin passing through the slit holes can be increased.

(9) In the above aspect, in the third step, the first member and the mold base may be fixed by inserting an insertion member into a hole formed in the first member on an opposite side of the surface where the laminated body is shaped and into a hole formed in the mold base. According to such an aspect, the base plate and the mold base can be firmly joined.

(10) According to a second aspect of this disclosure, a mold for use in an injection molding apparatus is provided. This mold includes a base plate having a first member, wherein a first opening is formed in the first member into which a second member is assembled; a laminated body which is shaped on the base plate; and a mold base having a second opening, wherein: the base plate on which the laminated body is formed is assembled into the second opening of the mold base.

What is claimed is:

1. A mold manufacturing method of a mold used in an injection molding apparatus, the mold manufacturing method comprising:

a first step of shaping a laminated body that becomes a part of the mold by discharging molding material and stacking layers on a base plate having a first member with a first opening and a second member that is assembled into the first opening;

a second step of removing the second member from the base plate on which at least a part of the laminated body has been shaped, and performing at least one of a cutting process or an insertion of a nesting member on the laminated body, which was at least partially shaped; and a third step, performed after the second step, of producing the mold by assembling the base plate on which the laminated body was shaped and the second member was removed, into a second opening that is provided in a mold base.

2. The mold manufacturing method according to claim 1, wherein:

the second member has a plurality of members and in the second step, at least one member of the plurality of members is removed, and at least one of the cutting processes and the insertion is performed.

3. The mold manufacturing method according to claim 1, wherein:

a surface of the first member on which the laminated body is shaped has a plurality of recesses or a plurality of through holes.

4. The mold manufacturing method according to claim 3, wherein:

the plurality of recesses or the plurality of through holes have a shape in which an opening area decreases toward the surface on which the laminated body is shaped.

5. The mold manufacturing method according to claim 3, wherein:

the first member has detachable fixing members that are inserted through the plurality of through holes to fix the laminated body to the first member.

6. The mold manufacturing method according to claim 1, wherein:

a side surface of the base plate has a first side surface and a second side surface, which is closer to a surface on which the laminated body is formed than is the first side surface, and the first side surface is farther away from a center of the base plate than is the second side surface.

7. The mold manufacturing method according to claim 1, wherein:

a surface of the second member on which the laminated body is shaped does not have a recess or a through hole.

8. The mold manufacturing method according to claim 1, wherein:

the mold base has a bottom portion at a bottom of the second opening and the bottom portion has a plurality of slit holes.

9. The mold manufacturing method according to claim 1, wherein:

in the third step, the first member and the mold base are fixed by inserting an insertion member into a hole formed in the first member on an opposite side of the surface where the laminated body is shaped and into a hole formed in the mold base.

* * * * *